(12) United States Patent
Michiels et al.

(10) Patent No.: US 9,710,623 B2
(45) Date of Patent: Jul. 18, 2017

(54) CRYPTOGRAPHIC SYSTEM

(75) Inventors: Wilhelmus P. A. J. Michiels, Eindhoven (NL); Paulus M. H. M. A. Gorissen, Eindhoven (NL)

(73) Assignee: Irdeto B.V., Hoofddorp (NL)

( * ) Notice: Subject to any disclaimer, the term of this patent is extended or adjusted under 35 U.S.C. 154(b) by 108 days.

(21) Appl. No.: 12/921,075

(22) PCT Filed: Mar. 2, 2009

(86) PCT No.: PCT/IB2009/050816
§ 371 (c)(1),
(2), (4) Date: Jan. 12, 2011

(87) PCT Pub. No.: WO2009/109884
PCT Pub. Date: Sep. 11, 2009

(65) Prior Publication Data
US 2011/0116625 A1  May 19, 2011

(30) Foreign Application Priority Data

Mar. 5, 2008  (EP) .................................... 08152276
Jun. 26, 2008  (EP) .................................... 08159061

(51) Int. Cl.
*H04L 29/06* (2006.01)
*G06F 21/14* (2013.01)
*H04L 9/06* (2006.01)

(52) U.S. Cl.
CPC .............. *G06F 21/14* (2013.01); *H04L 9/06* (2013.01); *H04L 9/0618* (2013.01);
(Continued)

(58) Field of Classification Search
CPC .. H04L 9/0618; H04L 9/0631; H04L 2209/16
(Continued)

(56) References Cited

U.S. PATENT DOCUMENTS 6,351,539 B1 * 2/2002 Djakovic ...................... 380/268
7,840,002 B2  11/2010 Ari .................................. 380/43
(Continued)

FOREIGN PATENT DOCUMENTS

CN  1565102 A  1/2005
JP  2003513490  4/2003  ............... G06F 1/00
(Continued)

OTHER PUBLICATIONS

Joye, "On White-Box Cryptography", Jan. 2008, pp. 7-12.*
(Continued)

*Primary Examiner* — David Pearson
*Assistant Examiner* — Thaddeus Plecha
(74) *Attorney, Agent, or Firm* — Rimon, P.C.; Marc Kaufman

(57) ABSTRACT

A cryptographic system comprises a white-box implementation of a function; an implementation of a cryptographic algorithm; and an implementation of a combining operation for establishing cryptographically processed data in dependence on an outcome of the function and in dependence on an outcome of the cryptographic algorithm. The combining operation comprises combining an outcome of the cryptographic algorithm with an outcome of the function. Alternatively, the combining operation comprises combining an outcome of the function with a received data element to obtain a combination outcome and applying the cryptographic algorithm to the combination outcome.

15 Claims, 4 Drawing Sheets

(52) U.S. Cl.
CPC ........ *H04L 9/0631* (2013.01); *H04L 2209/16* (2013.01); *H04L 2209/60* (2013.01)

(58) Field of Classification Search
USPC .......................................................... 380/28
See application file for complete search history.

(56) References Cited

U.S. PATENT DOCUMENTS

| | | | | |
|---|---|---|---|---|
| 8,000,473 | B2 | 8/2011 | Goubin et al. | 380/46 |
| 8,306,216 | B2 | 11/2012 | Michiels et al. | 380/28 |
| 8,479,016 | B2 | 7/2013 | Michiels et al. | 713/189 |
| 2003/0084308 | A1* | 5/2003 | Van Rijnswou | 713/189 |
| 2003/0235307 | A1* | 12/2003 | Miyamoto | H04L 9/002 380/269 |
| 2007/0086586 | A1 | 4/2007 | Jakubowski et al. | |
| 2008/0126805 | A1* | 5/2008 | Owlett et al. | 713/176 |
| 2009/0086964 | A1* | 4/2009 | Agrawal | G06F 21/10 380/44 |
| 2009/0123131 | A1* | 5/2009 | Morioka | 386/124 |
| 2009/0254759 | A1 | 10/2009 | Michiels et al. | 713/189 |
| 2009/0313480 | A1 | 12/2009 | Michiels et al. | 713/187 |
| 2010/0080395 | A1 | 4/2010 | Michiels et al. | 380/278 |
| 2012/0179919 | A1* | 7/2012 | Farrugia | G06F 21/602 713/193 |

FOREIGN PATENT DOCUMENTS

| | | | | |
|---|---|---|---|---|
| JP | 2006504206 | 2/2006 | | G06F 1/00 |
| JP | 2006511996 | 4/2006 | | G09C 1/00 |
| JP | 2008508806 | 3/2008 | | G06F 21/20 |
| JP | 2008516502 | 5/2008 | | H04L 9/10 |
| JP | 2009529819 | 8/2009 | | G06F 21/24 |
| JP | 2009543244 | 12/2009 | | G06F 21/00 |
| JP | 2009543498 | 12/2009 | | G09C 1/00 |
| JP | 2010510539 | 4/2010 | | G09C 1/00 |
| JP | 2010515945 | 5/2010 | | G09C 1/00 |
| WO | WO-99/67918 | 12/1999 | | |
| WO | WO0131422 | 5/2001 | | G06F 1/00 |
| WO | WO2004046846 | 6/2004 | | |
| WO | 2004057796 A1 | 7/2004 | | |
| WO | WO2006038104 | 4/2006 | | H04L 9/00 |
| WO | WO-2007/105126 A2 | 9/2007 | | |
| WO | WO2008007305 | 1/2008 | | |
| WO | WO2008010119 | 1/2008 | | |
| WO | WO2008059420 | 5/2008 | | H04L 9/06 |
| WO | WO2008084433 | 7/2008 | | H04L 9/06 |
| WO | WO-2009/136361 A1 | 11/2009 | | |

OTHER PUBLICATIONS

Saxena et al., "Towards Security Notions for White-Box Cryptography", 2009, pp. 49-58.*
"European Application Serial No. 09717405.6, Office Action mailed Jul. 5, 2011", 3 pgs.
"European Application Serial No. 09717405.6, Office Action mailed Apr. 17, 2012", 4 pgs.
"European Application Serial No. 09717405.6, Office Action mailed Oct. 10, 2010", 2 pgs.
"European Application Serial No. 09717405.6, Response filed Jan. 13, 2012 to Office Action mailed Jul. 5, 2011", 14 pgs.
"European Application Serial No. 09717405.6, Response filed Nov. 12, 2010 to Office Acton mailed Oct. 13, 2010", 3 pgs.
"International Application Serial No. PCT/IB2009/050816, International Preliminary Report on Patentability dated Sep. 7, 2010", 5 pgs.
"International Application No. PCT/IB2009/050816, International Search Report and Written Opinion mailed Jun. 19, 2009", (Jun. 19, 2009), 8 pgs.
Chow, S., et al., "White-Box Cryptography and an AES Implementation", 9th Annual International Workshop, SAC, vol. 2595, (Aug. 15, 2002), 250-270.
Chow, Stanley, et al., "A White-Box DES Implementation for DRM Application", Proceedings of ACM CCS-9 Workshop DRM, (Nov. 18, 2002), 1-16.
English translation of Chinese Office Action issued in corresponding Chinese Patent Application Serial No. 200980115038.0, dated Oct. 8, 2012. (8 pgs.).
Japanese Office Action issued in related application No. 2010-549219, dated May 22, 2013 (6 pgs).
Sato et al., "Reducing Data Size of Table Network Implementation of Block Cipher Software" (w/o English translation), the 2005 Symposium on Cryptography and Information Security, Maiko Kobe, Japan, Jan. 25-28, 2005, The Institute of Electronics, Information and Communication Engineers (8 pgs).
Ryumei Okamoto et al. "Modern Cipher", Sangyo Tosyo Co., Ltd., Jun. 30, 1997.
Shigeo Tsujii et al., "Cryptography and Information Security" Shokodo Co., Ltd., Mar. 29, 1990.
Examination Report in corresponding Canadian Application No. 2,717,625 dated May 4, 2016.

* cited by examiner

CRYPTOGRAPHIC SYSTEM

PRIORITY CLAIM TO RELATED APPLICATIONS

This application is a national stage application under 35 U.S.C. §371 of PCT/IB2009/050816, filed Mar. 2, 2009, and published as WO 2009/109884 A1 on Sep. 11, 2009, which claims priority to European Application No. 08152276.5, filed Mar. 5, 2008, and to European Application No. 08159061.4, filed Jun. 26, 2008, which applications and publication are incorporated herein by reference and made a part hereof in their entirety, and the benefit of priority of each of which is claimed herein.

FIELD OF THE INVENTION

The invention relates to a cryptographic system and to a method of cryptographic processing.

BACKGROUND OF THE INVENTION

In present days, content is increasingly made available in digital format to users, for example by means of the Internet, a broadcast medium, or by means of a digital data carrier such as CD or DVD. Consumer electronics (CE) products, such as televisions, settop boxes, and audio equipment, are equipped with digital data processing capabilities to render these digital contents.

Digital rights management systems have been introduced to control the distribution of digital content to legitimate users. Typically, digital rights management systems use an encryption technique which allows only legitimate users to decrypt the content. The implementation of such encryption techniques in the consumer devices may be obfuscated to make it more difficult for an attacker to find out the value of the key. Examples of ciphers commonly in use for many different kinds of applications are DES, AES, RSA, and the method disclosed in WO9967918.

In relation to key handling in digital rights management systems, for playback a media player has to retrieve a decryption key from a license database. It then has to store this decryption key somewhere in memory for the decryption of the encrypted content. This gives an attacker two options for an attack on the key. Firstly, reverse engineering of the license database access function could allow the attacker to retrieve asset keys from all license databases. Secondly, by observation of the accesses to memory during content decryption, it is possible to retrieve the asset key. In both cases the key is considered to be compromised.

In the field of software implemented cryptographic systems, the need for tamper resistant software products has given rise to obfuscation techniques preventing attackers from obtaining cryptographic keys and from unauthorized copying. One of these obfuscation techniques involves providing a white-box implementation of a cryptographic algorithm. White-box implementations of cryptographic algorithms are implementations that hide some or all of the inner workings of a cryptographic algorithm against a white-box attack, i.e., an attack in which an attacker can observe some or all of the instructions executed by the processor. In some cases, the attacker has some form of control over the operating environment, which allows him to observe at least part of the cryptographic operations and identify at least part of the cryptographic key used in the algorithm during execution. For example he can execute the implementation inside a debugging environment or virtual machine and thereby observe all operations, manipulate data buffers and monitor the execution flow.

In other cases, the attacker can cause the operating environment to 'leak' or divulge part of the implementation or part of the contents of data buffers during execution of the cryptographic algorithm. For example, he may be able to use a buffer overflow attack to extract parts of the cryptographic implementation. If the right part is extracted, he may thereby learn the cryptographic key or particular settings in the implementation that allow him to undo some or all of the cryptographic protection.

White-box implementations hide some or all of the inner workings of a cryptographic algorithm, in particular the key data. This can be done in a variety of ways. A popular technique for creating white-box implementations is using a combination of encoding tables in the cryptographic algorithm with random bijections representing compositions rather than individual steps. The decryption key and the decryption algorithm are effectively turned into one monolithic block. No single part of this block reveals any information about the inner workings of the algorithm or the key. In fact even when given the entire white-box implementation it is extremely difficult to reverse engineer the original algorithm or the decryption key used. Another technique, disclosed in e.g. European patent application serial number 08155798.5 is obfuscation of an exponent in cryptographic algorithms such as RSA.

Currently, white-box implementations are only known for a limited number of ciphers. "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1", and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, DC, USA, Nov. 18, 2002, referred to hereinafter as "Chow 2", disclose methods of creating white-box implementations of cryptographic algorithms, in particular for the cryptographic algorithms known as AES and DES.

SUMMARY OF THE INVENTION

It would be advantageous to have a more flexible way of creating a white-box implementation of a cryptographic algorithm. To better address this concern, in a first aspect of the invention a cryptographic system is presented that comprises a white-box implementation of a function;

an implementation of a cryptographic algorithm; and an implementation of a combining operation for establishing cryptographically processed data in dependence on an outcome of the function and in dependence on an outcome of the cryptographic algorithm.

Because of the white-box implementation, the mapping defined by the function cannot be easily discovered by an attacker. Consequently, by feeding appropriate values to the white-box implementation of the function, a sequence of values can be generated which is difficult for an attacker to predict. By combining the outcome of a cryptographic algorithm with the outcome of the white-box implementation, it becomes more difficult for an attacker to break the cryptographic system. In effect, the strength of the cryptographic algorithm is enhanced with the security properties of the white-box implementation.

It is not necessary to provide a white-box implementation of the cryptographic algorithm itself. The cryptographic algorithm may be based on RSA, for example.

The function is preferably a function whose behavior is difficult to predict by monitoring the inputs and outputs of the white-box implementation of the function. The function may comprise, for example, a further cryptographic algorithm such as DES or AES. In such a case the white-box implementation of the function comprises a white-box implementation of the further cryptographic algorithm. Alternatively, the function may be a hash function or a random generator. In such a case, the white-box implementation of the function comprises a white-box implementation of the hash function or random generator, as the case may be.

The combining operator may comprise, for example, an XOR operation or an addition modulo $2^k$, for some positive integer k. The combining operation may or may not be implemented as a white-box implementation.

The abovementioned techniques for creating a white-box implementation can be used, although other white-box techniques known now or devised hereafter may also be used. Preferably the white-box implementation is not too small in size and has the property that if an attacker has any part of the implementation (including the key used by the algorithm), then it is difficult for him to derive from this a functionally correct version of the function which is the subject of the white-box implementation. This assumption is weaker than what is often assumed in white-box implementations, namely that the attacker has complete control over the environment. Preferably, from a part of the white-box implementation an attacker cannot derive the underlying key or, in case of a random generator, the seed used. Some white-box techniques, for example the abovementioned usage of a combination of encoding tables, are designed to withstand white-box attacks where the attacker has complete control over the environment. While such techniques are suitable for the purposes of the present invention, there are other, easier white-box techniques that are also suitable for the present invention. As an example, when creating a white-box implementation of AES may suffice to encode the input and output of each lookup table by a non-linear encoding. By encoding the output of the lookup tables that precede a XOR operation by linear encodings (and, correspondingly, also the inputs of the lookup tables that follow the XOR operation), it is not necessary for the purpose of the present invention to implement the XOR operation by a lookup table.

The independent claims define further aspects of the invention. The dependent claims define advantageous embodiments.

BRIEF DESCRIPTION OF THE DRAWINGS

These and other aspects of the invention will be further elucidated and described with reference to the drawing, in which.

DETAILED DESCRIPTION OF EMBODIMENTS

Figure 1:
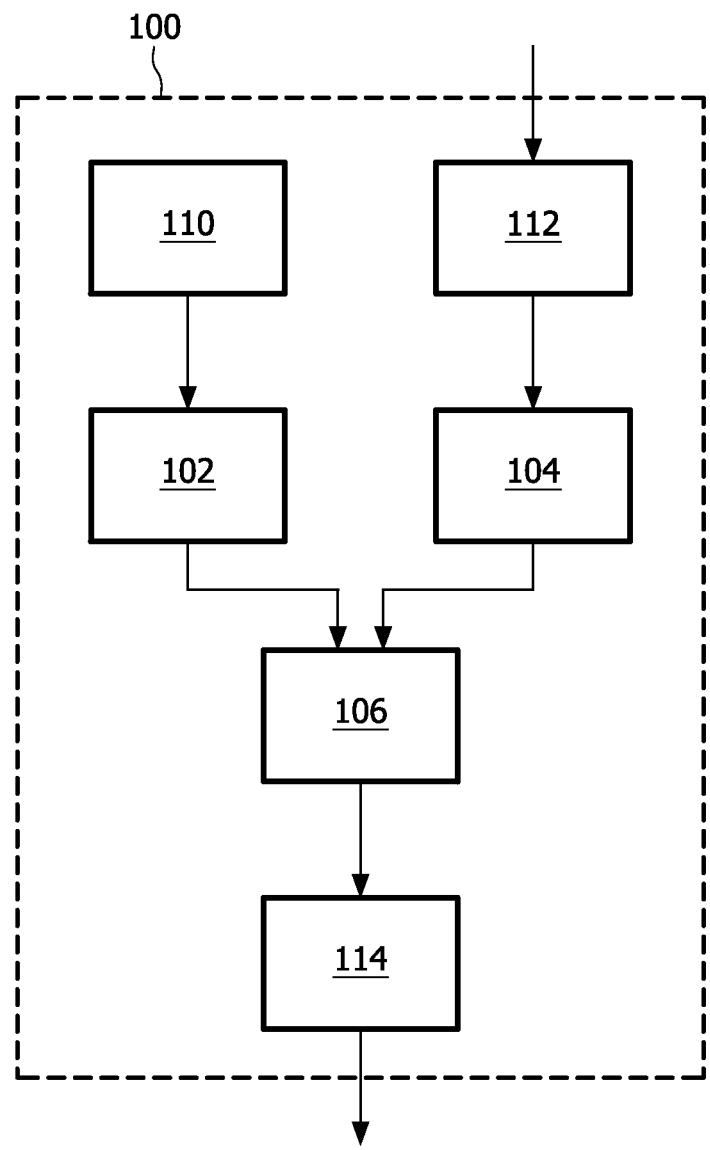
FIG. 1 illustrates a diagram of an embodiment of a cryptographic system.

Currently, white-box implementations are only known for a limited number of ciphers (e.g. AES, DES, Lombok). The following provides a description of a generic approach for building on top of a known white-box implementation (of a cipher or another function), a white-box implementation for an arbitrary cipher (or, more generally, function). The white-box implementation can be built in such a way that it does not cost much additional processing time.

A cryptographic system may be created comprising a white-box implementation of a function, an implementation of a cryptographic algorithm, and an implementation of a combining operation for establishing cryptographically processed data in dependence on an outcome of the function and in dependence on an outcome of the cryptographic algorithm. By virtue of the white-box implementation of the function and the combining operation, the whole cryptographic system becomes a white-box implementation. Several combining operations are imaginable, some of which will be described in more detail using FIGS. 1-4. As an example not shown in the drawings, it is possible to combine the function and the cryptographic algorithm by means of composition: first apply the function, then the cryptographic algorithm or first the cryptographic algorithm and then the function.

FIG. 1 illustrates a block diagram of a cryptographic system 100. The cryptographic system has an input 112 where it receives data which is to be processed cryptographically. For example, the data to be processed is plain text which has to be encrypted, or it is cipher text which has to be decrypted. Alternatively, the data to be processed is data for which a digital signature is to be generated. The cryptographic system 100 may be used in conjunction with a complementary cryptographic system (not shown). If system 100 comprises an encryption system, the complementary cryptographic system may comprise a decrypter. If, on the other hand, system 100 comprises a corresponding decryption system, the complementary cryptographic system may comprise a corresponding encryption system. So, two cryptographic systems are called complementary systems in this text when one system is capable of processing the messages produced by the other system.

The cryptographic system 100 further comprises an implementation 104 of a cryptographic algorithm. This implementation need not be a white-box implementation, although it is possible to implement the cryptographic algorithm at least partly using techniques known by themselves from the art of white-box implementations. The cryptographic system 104 may comprise a decrypter or an encrypter. Typically, if the system 100 is used for decryption, cryptographic system 104 comprises a decrypter. Alternatively, if the system 100 is used for encryption, cryptographic system 104 comprises an encrypter. Since the implementation 104 of the cryptographic algorithm does not have to be a white-box implementation, there is a lot of freedom in selecting the cryptographic algorithm used. In particular, a cryptographic algorithm for which no white-box implementation is known, or for which a white-box implementation would otherwise be inconvenient to use, may be applied.

Also, the cryptographic system 100 comprises a means 110 for generating a value x. This value x may be derived from the cipher text corresponding to the data which is received by the input 112, for example. Or, it may comprise a counter which is increased at predetermined instances. The means 110 is preferably arranged for generating a value x which the complementary cryptographic system is capable of reproducing. This may be arranged by synchronizing the value x with the complementary system, which may be accomplished by exchanging a message comprising a representation of the current value of x.

The value x may be provided to a white-box implementation 102 of a function. This function is preferably not very easily understood by analyzing its inputs and outputs. For example, it comprises a cryptographic algorithm such as AES. Alternatively, it may comprise a hash function or a random generator function. By itself, a way to create such a white-box implementation is known from Chow et al.

The outputs produced by the white-box implementation 102 of the function and the implementation 104 of the cryptographic algorithm are combined by means of an implementation 106 of a combining operation. The result produced by the implementation 106 of the combining operation depends on the outcome produced by the implementation 102 of the function and on the outcome produced by the implementation 104 of the cryptographic algorithm. Shown in FIG. 1 is the situation in which the implementation 102 of the function and the implementation 104 of the cryptographic algorithm operate in parallel and produce results which are independent of each other. The implementation 106 of the combining operation combines these outputs into a single result. Thus, the combining operation comprises combining an outcome of the cryptographic algorithm with an outcome of the function. The combining operation is preferably such that the independent results of the function and the cryptographic algorithm cannot be extracted from the single result. For example, an XOR operation is used to combine the results, or an addition modulo some value $2^k$ for some k.

The result of the implementation 106 of the combining operation is provided to an output 114. Output 114 may comprise a packager for creating output data packets from the data retrieved from the results it is provided with, for example. Output 114 may comprise a transmitter for transmitting the data via a network, for example a broadcast network or the Internet, to a receiver. Alternatively, output 114 may be arranged for providing the result obtained from implementation 106 to a display or amplifier to create a presentation of the data.

Figure 2:
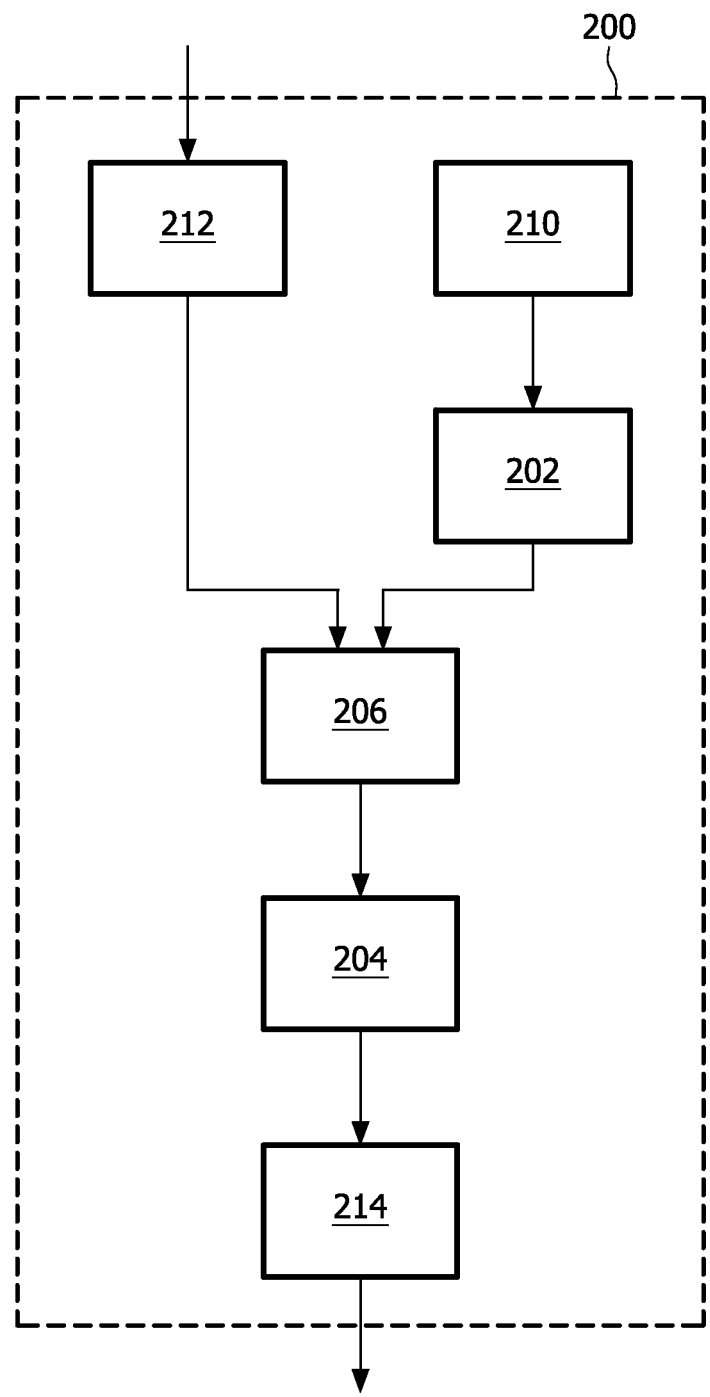
FIG. 2 illustrates a diagram of another embodiment of a cryptographic system.

FIG. 2 illustrates a cryptographic system 200 which is another embodiment of the cryptographic system set forth. In cryptographic system 200, the combining operation comprises combining an outcome of the function with a received data element to obtain a combination outcome and applying the cryptographic algorithm to the combination outcome.

Similar to system 100, the system 200 comprises an input 212, a means 210 for generating a value x, a white-box implementation 202 of a function, an implementation 204 of a cryptographic algorithm, an implementation 206 of a combining operation, and an output 214. However, in the system 200, the order of execution is different from that in the system 100. The system 200 effectively computes F(C(y,G(x))), wherein G represents the function, F represents the cryptographic algorithm, C represents the combining operation, and y represents a value obtained at input 212. The implementation 206 of the combining operation combines the data obtained at input 212 with a result produced by the white-box implementation 202 of the function thereby generating a combination outcome, and causes the implementation 204 of the cryptographic algorithm to process the combination outcome. The result thereof is provided to the output 214.

In an embodiment, given a particular value of an outcome of the function, the combining operation defines a one-to-one correspondence between the outcome of the cryptographic algorithm and an outcome of the combining operation. This is useful if the system 100 or 200 is used for encrypting data, for example, because it allows to uniquely decrypt the data at the decrypter.

In an embodiment, the output 214 comprises a signal generator for generating a signal comprising a representation of an outcome of the combining operation. This signal may be stored on a storage means, or transmitted to a receiver, for example. The signal generator may be arranged for including in the signal a representation of an input to the first function. This may be omitted if the receiving party is capable of obtaining this value in a different way. The implementation of the combining operation may be arranged for combining a single outcome of the function with a plurality of outcomes of the cryptographic algorithm. This improves efficiency by re-using the same outcome of the function a plurality of times. Accordingly, the corresponding input to the function needs to be included in the signal only once.

The white-box implementation may comprise a look-up table and an XOR operation. According to Chow et al., explicit XOR operations are replaced by look-up tables which are obfuscated using input and output encodings. To improve the efficiency, these look-up tables may be replaced by explicit XOR operations. It was found that this still provides sufficient white-box security for some applications, as it still prevents an attacker from deriving the underlying key from a part of the white-box implementation.

To bind the white-box implementation to a hardware device, or to a particular user, the white-box implementation may comprise means for accessing data identifying a device and/or a user to obtain identification data, and means for establishing the output of the function in dependence on the identification data. For example, one or more of the look-up tables is chosen such that it includes the identifying data. The other look-up tables may be adapted so that the overall end result of the white-box implementation is not altered by this. This feature allows to prevent unauthorized use of the cryptographic system. Examples of this technique have been disclosed in WO 2007/105126.

Figure 3:
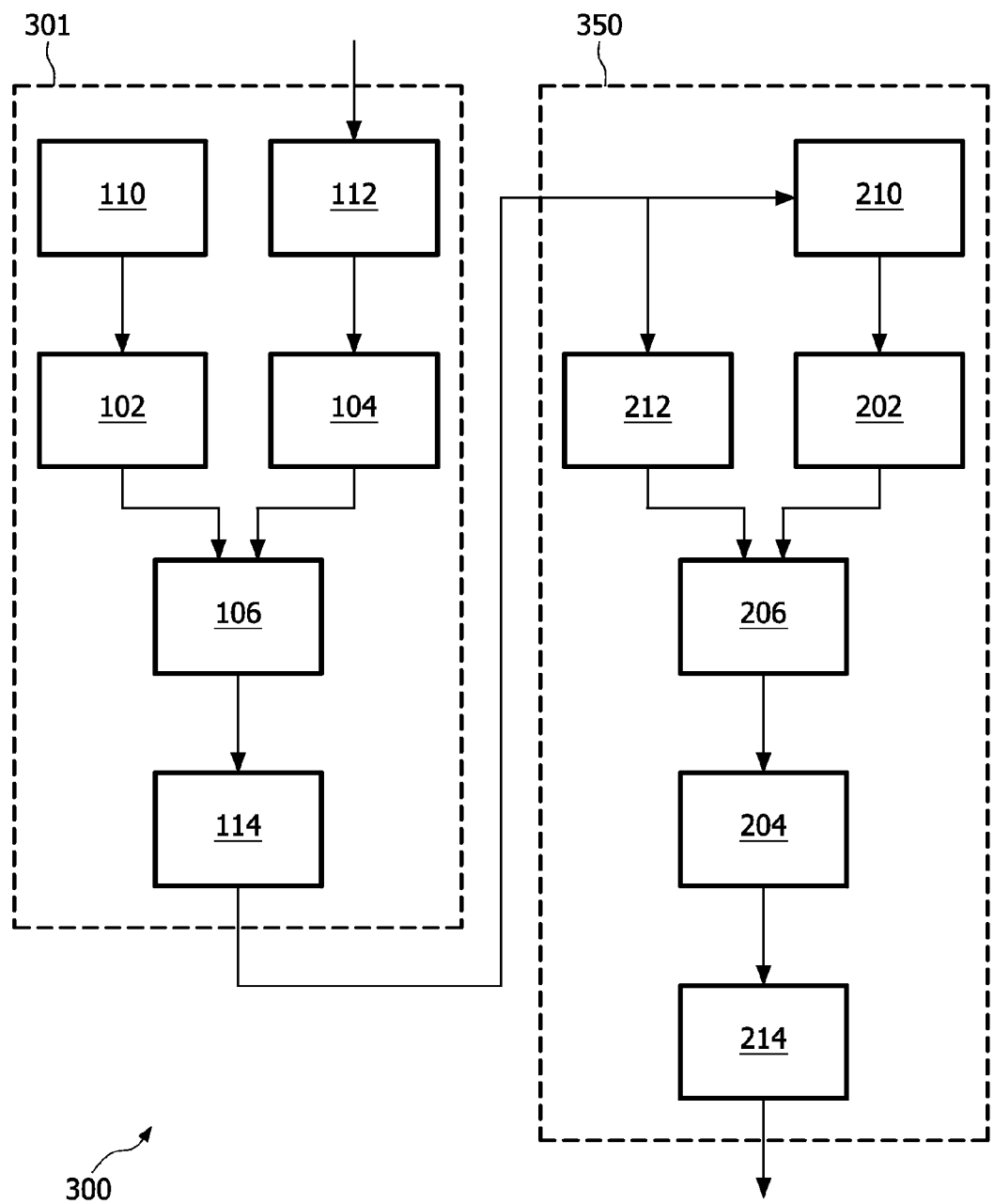
FIG. 3 illustrates a diagram of a system comprising an encrypter and a decrypter.

FIG. 3 illustrates an embodiment of an encrypter 301 and a decrypter 350. The encrypter 301 is based on the cryptographic system 100 and the decrypter is based on the cryptographic system 200. However, this is not a limitation. For example, it is also possible to base an encrypter on cryptographic system 200 and to base a decrypter on cryptographic system 100. For example, the encrypter 301 may be included in a content server and used for encrypting audio or video content, and the decrypter 350 may be included in a consumer electronics device for decrypting the encrypted content and allowing playback of the content. Communication between encrypter 301 and decrypter 350 may take place via the Internet, a digital broadcast medium such as cable television network, or via a removable storage medium such as a DVD or Blue-ray disc. Like reference numerals have been drawn in to identify elements similar to those in FIG. 1 and FIG. 2. The encrypter 301 comprises:

an input 112 for obtaining data to be encrypted by means of a first cryptographic algorithm (which may be an encryption algorithm such as a public key encryption algorithm, e.g. RSA).

an implementation 104 of the first cryptographic algorithm arranged for encrypting the data obtained at input 112.

a means 110 for generating a value x. A counter or random generator may be used for this. It is also possible to obtain the value x from an external source or to generate it from an output of the implementation 104 of the cryptographic algorithm.

an implementation 102 of a first function which is applied to the value x.

an implementation 106 of a first combining operation for establishing encrypted data in dependence on an outcome of the first function and in dependence on an outcome of the first cryptographic algorithm.

an output 114 for providing information representing an outcome of the first combining operation to the decrypter 350. The output may also provide information representing the input to the first function to the decrypter 350.

The decrypter 350 comprises:

an input 210 for obtaining the information representing an input to the first function. This information may be received from output 114 of the encrypter 301. It is also possible to reproduce the values x in the decrypter 350. In that case, input 210 may be replaced by a copy of the means 110 for generating the value x.

an input 212 for obtaining the information representing an outcome of the first combining operation from the output 114 of the encrypter 301.

an implementation 202 of a second function, arranged for applying the second function to a value which is based on at least part of the information representing the input to the first function. The second function may be identical to the first function. However, if the value x is transmitted to the decrypter 350 in an encoded form, this encoding is undone by the second function.

an implementation 206 of a second combining operation for establishing decrypted data in dependence on an outcome of the second function and in dependence on an outcome of the second cryptographic algorithm. The implementation 206 of the second combining operation first undoes the effect of the first combining operation 106. For example, if the first combining operation involves a multiplication of the output of implementation 102 with the output of implementation 104, then the second combining operation may comprise a multiplication of the value obtained at input 212 with an inverse of an output of the implementation 202 of the second function to obtain an intermediate combined value. After that, the implementation 206 of the second combining function causes the implementation 204 of the second cryptographic function to apply its second cryptographic function to the intermediate combined value thereby generating decrypted data. To this end, implementation 206 may comprise control means (not shown) for invoking the implementation 204 of the second cryptographic algorithm.

an implementation 204 of a second cryptographic algorithm, arranged for applying the cryptographic algorithm to data derived from at least part of the information representing the outcome of the first combining operation. The second cryptographic algorithm is for example the decryption algorithm corresponding to the encryption algorithm used for the first cryptographic algorithm.

Either the implementation 102 of the first function or the implementation 202 of the second function, or both, are white-box implementations, for securing the encrypter 301 or the decrypter 350, or both, respectively, against unauthorized tampering.

Figure 4:
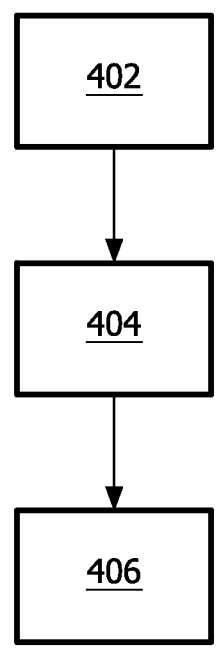
FIG. 4 illustrates a cryptographic process.

FIG. 4 illustrates a method of cryptographic processing, comprising applying 402 a function to a first value by means of a white-box implementation thereof; applying 404 a cryptographic algorithm to a second value; and applying 406 a combining operation for establishing cryptographically processed data in dependence on an outcome of the function and in dependence on an outcome of the cryptographic algorithm. The order of the processing steps shown in FIG. 4 is only an example and is not a limitation.

Let the function F denote a cryptographic algorithm. In the following a white-box implementation of the function F will be described. For instance, if the goal is to derive a white-box implementation of the encryption algorithm of RSA, then F(m) denotes the cipher text associated with the message m, and if the goal is to derive a white-box implementation for hash function MD4, then F(m) denotes the hash value associated with the message m.

Let G denote an arbitrary function for which a white-box implementation is available. The function G need not be bijective. It can, for instance, be a hash function or a random generator function. The domain of F and G is denoted by dom(F) and dom(G), respectively, and the range of F and G is denoted by im(F) and im(G), respectively. Furthermore, let n be the bit length of the values in im(F) and let m be the bit length of the values in dom(G).

A function C is defined, C : im(G)×im(F)→im(F), which is preferably bijective in its second argument. Preferably, C is efficiently computable. For instance, $C(x, y) = x \cdot y$ or $C(x, y) = x+y$.

Next, a function H is introduced, H : dom(G)×dom(F)× dom(G)×im(F), the function H being defined by $H(x, y) = (x, C(G(x), F(y)))$.

The function H defines a cryptographic algorithm. In view of the way H is built up of F and G, an implementation of H may be constructed such that it 'inherits' the cryptographic properties of F and the white-box properties of G. Consequently, the cryptographic strength of F is combined with the tamper-resistance properties of a white-box implementation of G. Consequently, with respect to its black-box security H may be made at least as secure as F. Also, with respect to its white-box security H may be white-box secure by implementing G at least partially in the form of a white-box implementation, even if F and C may be implemented in the form of an implementation which is not white-box. If F represents an encryption or decryption algorithm of a block cipher having output block size $n_F$ and G represents a function with input data of size $n_G$, then the data to be transmitted may be of size $n_F + n_G$, since both the input data of G and the output of G are included in H. Suppose that x is given by a constant value a, or suppose x is otherwise known at a decrypter. Then it is not necessary to run the white-box implementation to derive the output of H. It is then sufficient to run the implementations of C and F, which may be computationally efficient when compared to the white-box implementation of G. Furthermore, in such case, the value x may be omitted from the cipher text, which reduces the size of the cipher text. This makes the following approach possible.

It is also possible to change x every once in a while rather than for every data block. In this way it is possible to trade off white-box security against performance. Note that, if H specifies an encryption algorithm, then the cipher text may be given by H (x, y)=(x, C(G(x), F(y))) if x has been changed and it may be given by only $H_x$ (y)=C(G(x), F(y)) if x has not been changed. If H specifies a decryption algorithm, then the cipher text may be given by (x,y) if x has been changed and it may be given by only y if x has not been changed. It is also envisaged to use a predetermined sequence of values of x or to make x dependent on the ciphertext. This would also reduce the amount of data to be transmitted from the encrypter to the decrypter.

It is noted that the above described techniques and processes may also be applied using, for example, H (x, y)=(D(x),C(G(x),F(y))), for some function D. D is chosen with the property that G(x) can be derived from D(x). So the receiving side then preferably implements a function E defined by E(D(x))=G(x).

In an embodiment, a white-box implementation of RSA is constructed based on the white-box implementation of AES. The white-box implementation of AES described by Chow et al. would be suitable for this purpose, although another kind of white-box implementation may also be used. RSA and AES are used here as an example. Other functions, be it cryptographic functions or not, may be used as alternatives instead of RSA and AES.

Let the function F denote the RSA encryption algorithm. Consequently, for a data block m, F(m) denotes the cipher text associated with data block m, according to RSA. It is assumed that some particular key or set of keys is used in conjunction herewith, however the details of key handling are not described in detail in this text. The usage of cryptographic keys in cryptographic algorithms such as RSA is known in the art. In the present embodiment, the block size of m is less than 128 bits. However, this is not a limitation. 128 bits corresponds to the block size of AES, which is convenient in view of the fact that AES is also used in this embodiment. In the present embodiment, the function G represents the encryption algorithm of AES and C represents a multiplication in $GF(2^{128})$, i.e., C(x, y)=x·y for x, y∈GF $(2^{128})$. A counter T is used to provide values of x. The following process steps are used to encrypt messages according to H.

If some pre-specified condition is met, increase the counter T. For example the counter may be increased after every K data blocks.

Next, the value γ=C(G(x),F(y))=G(x)·F(y) is computed, where x is given by the value of counter T and y is given by the data block which is to be encrypted.

Next, the ciphertext block is composed. If the counter has changed since the last encryption, or if this is the first encryption, or if it is otherwise likely that the decrypter does not know the value of the counter, then the ciphertext is given by H (x, y)=(x, γ). Otherwise it is given by γ.

These steps are repeated for subsequent data blocks which are to be encrypted. As will be understood, the ciphertext typically comprises the values of γ, and may or may not comprise one, some, or all values of x (or D(x), as the case may be), as long as there is a mechanism in place which makes the decrypter use the same or functionally equivalent values of G(x) as used in the encrypter. It will also be understood that, instead of a counter T, the value x may be the result of a random value generator or may be computed from the plain text or cipher text, by means of some hash function, for example.

G may be implemented as a white-box implementation. This way, the implementation of H may be made to be a white-box implementation by implementing G as a white-box implementation.

A decryption process which is capable of decrypting the data encrypted in the way set forth is the following.

If a cipher text block contains the value x, then G(x) is computed from using the value x of the cipher text block. Otherwise, a value of G(x) computed earlier is used.

Next, determine $(G(x))^{-1}$ in GF $(2^{128})$. It is noted that $(G(x))^{-1}$ represents an inverse of G(x) in GF $(2^{128})$ (rather than the inverse of the function G).

After that, compute $F(y)=(G(x))^{-1} \cdot \gamma$.

Next, a decryption algorithm of RSA is used to compute a plain text block y based on F(y). Such a decryption algorithm of RSA is known in the art. In this step, F(y) is regarded as a ciphertext block.

It is noted that to create a white-box implementation of this decryption process, it is sufficient to provide a white-box implementation of the function G, since it will be difficult for an attacker to break the implementation if he cannot break the function G.

If the decryption process keeps its own copy of the counter T and if it knows the condition by which it is increased, then the value x need not be added to the cipher text. Hence, in that case the block size is not increased. Instead of a counter, we could also derive the value x from a previous cipher text block. Also in this case the value x need not be added to the cipher text.

The techniques described herein may be used to hide a cryptographic key from an attacker who has access to the software implementation that uses the key.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method comprising:
    selecting a cryptographic algorithm for which a white-box implementation is not known; and
    configuring a computer processor to provide a white-box implementation of a cryptographic system that implements the selected cryptographic algorithm, said configuring comprising configuring the computer processor to execute one or more instructions that cause the computer processor to perform:
        a white-box implementation of a function, wherein the white-box implementation of the function is configured for accessing data identifying at least one of a device and a user to obtain identification data, and establishing an outcome of the function in dependence on the identification data;
        an implementation of the selected cryptographic algorithm;
        an implementation of a combining operation for establishing cryptographically processed data in dependence on a single outcome of the function and in dependence on a plurality of outcomes of the cryptographic algorithm, the combining operation comprising combining the plurality of outcomes of the cryptographic algorithm with the single outcome of the function; and
        an implementation of a signal generator for generating a signal comprising a representation of an outcome of the combining operation.

2. The method according to claim 1, wherein given a particular value of the single outcome of the function, the combining operation defines a one-to-one correspondence between the plurality of outcomes of the cryptographic algorithm and the outcome of the combining operation.

3. The method according to claim 1, wherein the signal generator is arranged for including in the signal a representation of an input to the function.

4. The method according to claim 1, wherein the signal generated by the signal generator comprises a representation of an input to the function and representations of the plurality of outcomes of the cryptographic algorithm.

5. The method according to claim 1, wherein the white-box implementation of the function comprises a look-up table and an XOR operation.

6. The method according to claim 1, wherein the one or more instructions cause the computer processor to generate a reproducible input, the white-box implementation of the function being implemented using the input.

7. The method according to claim 1, wherein the one or more instructions cause the computer processor to generate a non-random input, the white-box implementation of the function being implemented using the input.

8. The method according to claim 1, wherein the one or more instructions cause the computer processor to combine the plurality of outcomes of the cryptographic algorithm with the single outcome of the function using at least one of XOR and a modulo operation.

9. A method of cryptographic processing, which is implemented by a computer, comprising:
    applying a function to a first value by a white-box implementation of the function, wherein the applying the function to the first value by the white-box implementation comprises accessing data identifying at least one of a device and a user to obtain identification data, and establishing an outcome of the function in dependence on the identification data;
    applying a cryptographic algorithm to a second value;
    applying a combining operation for establishing cryptographically processed data in dependence on a single outcome of the function and in dependence on a plurality of outcomes of the cryptographic algorithm, wherein the applying the combining operation comprises combining the plurality of outcomes of the cryptographic algorithm with the single outcome of the function; and
    generating a signal comprising a representation of an outcome of the combining operation.

10. The method according to claim 9, wherein given a particular value of the single outcome of the function, the combining operation defines a one-to-one correspondence between the plurality of outcomes of the cryptographic algorithm and the outcome of the combining operation.

11. The method according to claim 9, wherein the generating the signal comprises including in the signal a representation of an input to the first function.

12. The method according to claim 9, wherein the generating step further comprises including in the signal a representation of an input to the function and the plurality of outcomes of the cryptographic algorithm.

13. The method according to claim 9, wherein the white-box implementation comprises a look-up table and an XOR operation.

14. An non-transitory computer readable recording medium having recorded thereon a computer program comprising instructions for causing a processor to perform a method of cryptographic processing, the method comprising:
    applying a function to a first value by a white-box implementation of the function, wherein the applying the function to the first value by the white-box implementation comprises accessing data identifying at least one of a device and a user to obtain identification data, and establishing an outcome of the function in dependence on the identification data;

applying a cryptographic algorithm to a second value;

applying a combining operation for establishing cryptographically processed data in dependence on a single outcome of the function and in dependence on a plurality of outcomes of the cryptographic algorithm, wherein the applying the combining operation comprises combining the plurality of outcomes of the cryptographic algorithm with the single outcome of the function: and generating a signal comprising a representation of an outcome of the combining operation.

15. A system arranged comprising a hardware processor arranged to perform a method of cryptographic processing, the method comprising:

applying a function to a first value by a white-box implementation of the function, wherein the applying the function to the first value by the white-box implementation comprises accessing data identifying at least one of a device and a user to obtain identification data, and establishing an outcome of the function in dependence on the identification data;

applying a cryptographic algorithm to a second value;

applying a combining operation for establishing cryptographically processed data in dependence on a single Outcome of the function and in dependence on a plurality of outcomes of the cryptographic algorithm, wherein the applying the combining operation comprises combining the plurality of outcomes of the cryptographic algorithm with the single outcome of the functions; and generating a signal comprising a representation of an outcome of the combining operation.

* * * * *